(12) United States Patent
Götz

(10) Patent No.: US 10,439,506 B2
(45) Date of Patent: Oct. 8, 2019

(54) MATRYOSHKA CONVERTER

(71) Applicant: Dr. Ing. h.c. F. Porsche Aktiengesellschaft, Stuttgart (DE)

(72) Inventor: Stefan Götz, Forstern (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 15/747,841

(22) PCT Filed: Apr. 4, 2016

(86) PCT No.: PCT/EP2016/025031
§ 371 (c)(1),
(2) Date: Jan. 26, 2018

(87) PCT Pub. No.: WO2017/016675
PCT Pub. Date: Feb. 2, 2017

(65) Prior Publication Data
US 2018/0212530 A1   Jul. 26, 2018

(30) Foreign Application Priority Data
Jul. 30, 2015   (DE) .................. 10 2015 112 513

(51) Int. Cl.
*H02M 7/00* (2006.01)
*H02M 7/49* (2007.01)
(Continued)

(52) U.S. Cl.
CPC ............ *H02M 7/003* (2013.01); *H02M 7/49* (2013.01); *H02M 2007/4835* (2013.01)

(58) Field of Classification Search
CPC .................. H02M 7/003; H02M 7/49; H02M 2007/4835; H02M 2007/4822; H02M 7/483
See application file for complete search history.

(56) References Cited

U.S. PATENT DOCUMENTS 5,499,178 A * 3/1996 Mohan ................. H02J 3/01
307/105
6,005,788 A * 12/1999 Lipo ................... H02M 7/49
363/71

(Continued)

FOREIGN PATENT DOCUMENTS

CN       102611345      *  7/2012
DE   102010052934 A1     5/2012
(Continued)

OTHER PUBLICATIONS

Machine English Translation of CN102611345, Chengyong Zhao, Topological method of modular multilevel converter structure based on loop nesting mechanism, Jul. 25, 2012.*

(Continued)

*Primary Examiner* — Yusef A Ahmed
*Assistant Examiner* — Sisay G Tiku
(74) *Attorney, Agent, or Firm* — RatnerPrestia

(57) ABSTRACT

An electric converter system including modules nested inside one another which have at least two levels of nesting is disclosed. At least one embedded module of a first nesting level is provided, which includes at least two electrical connections and a power train. The power train includes at least two embedded modules nested with each other of an at least second next lower nesting level, such that the modules are embedded inside one another. Each of the modules has switching elements for dynamically switching between switch states between at least two modules of a nesting level. A method for providing an electrical converter system is also disclosed.

5 Claims, 18 Drawing Sheets

(51) Int. Cl.
*H02M 7/483* (2007.01)
*H02M 7/48* (2007.01)

(56) References Cited

U.S. PATENT DOCUMENTS

| | | | | |
|---|---|---|---|---|
| 6,621,719 | B2* | 9/2003 | Steimer | H02M 7/49 363/43 |
| 7,269,037 | B2 | 9/2007 | Marquardt | |
| 7,830,687 | B2* | 11/2010 | Du | H02M 7/49 307/45 |
| 9,496,799 | B2 | 11/2016 | Goetz et al. | |
| 9,559,523 | B2* | 1/2017 | Zabaleta Maeztu | H02M 7/483 |
| 9,748,862 | B2* | 8/2017 | Cheng | H02M 7/487 |
| 9,819,285 | B2 | 11/2017 | Davies | |
| 9,866,147 | B2* | 1/2018 | Kidera | H02M 7/483 |
| 9,929,634 | B2* | 3/2018 | Nami | H02M 7/483 |
| 10,003,251 | B2* | 6/2018 | Wu | H02M 1/143 |
| 2005/0083716 | A1* | 4/2005 | Marquardt | H02M 5/271 363/132 |
| 2007/0235293 | A1* | 10/2007 | Steimer | H02M 7/49 200/2 |
| 2008/0238214 | A1* | 10/2008 | Barbosa | H02M 7/483 307/113 |
| 2009/0231896 | A1* | 9/2009 | Barbosa | H02M 7/49 363/131 |
| 2013/0119970 | A1* | 5/2013 | Trainer | H02M 3/07 323/364 |
| 2014/0211520 | A1* | 7/2014 | Zhang | H02M 1/126 363/37 |
| 2015/0123612 | A1* | 5/2015 | Ide | H02M 1/10 320/109 |
| 2018/0062291 | A1* | 3/2018 | Gotz | H01R 12/721 |

FOREIGN PATENT DOCUMENTS

| | | |
|---|---|---|
| DE | 102011108920 A1 | 1/2013 |
| DE | 102013205562 A1 | 10/2014 |
| JP | 2005528870 A | 9/2005 |
| JP | 2014522230 A | 8/2014 |

OTHER PUBLICATIONS

Goetz et al., "Modular Multilevel Converter with Series and Parallel Module Connectivity: Topology and Control," IEEE Transactions on Power Electronics, vol. 30, No. 1, 2015, pp. 203-215.

Lesnicar et al., "An Innovative Modular Multilevel Converter Topology Suitable for a Wide Power Range," IEEE Power Tech Conference Proceedings, 2003, pp. 1-6.

International Search Report and Written Opinion for International Application No. PCT/EP2016/025031, dated Jul. 5, 2016—9 pages.

Notification of Reason for Rejection for Japanese Application No. 2018-504784, dated Mar. 12, 2019, 3 pages.

* cited by examiner

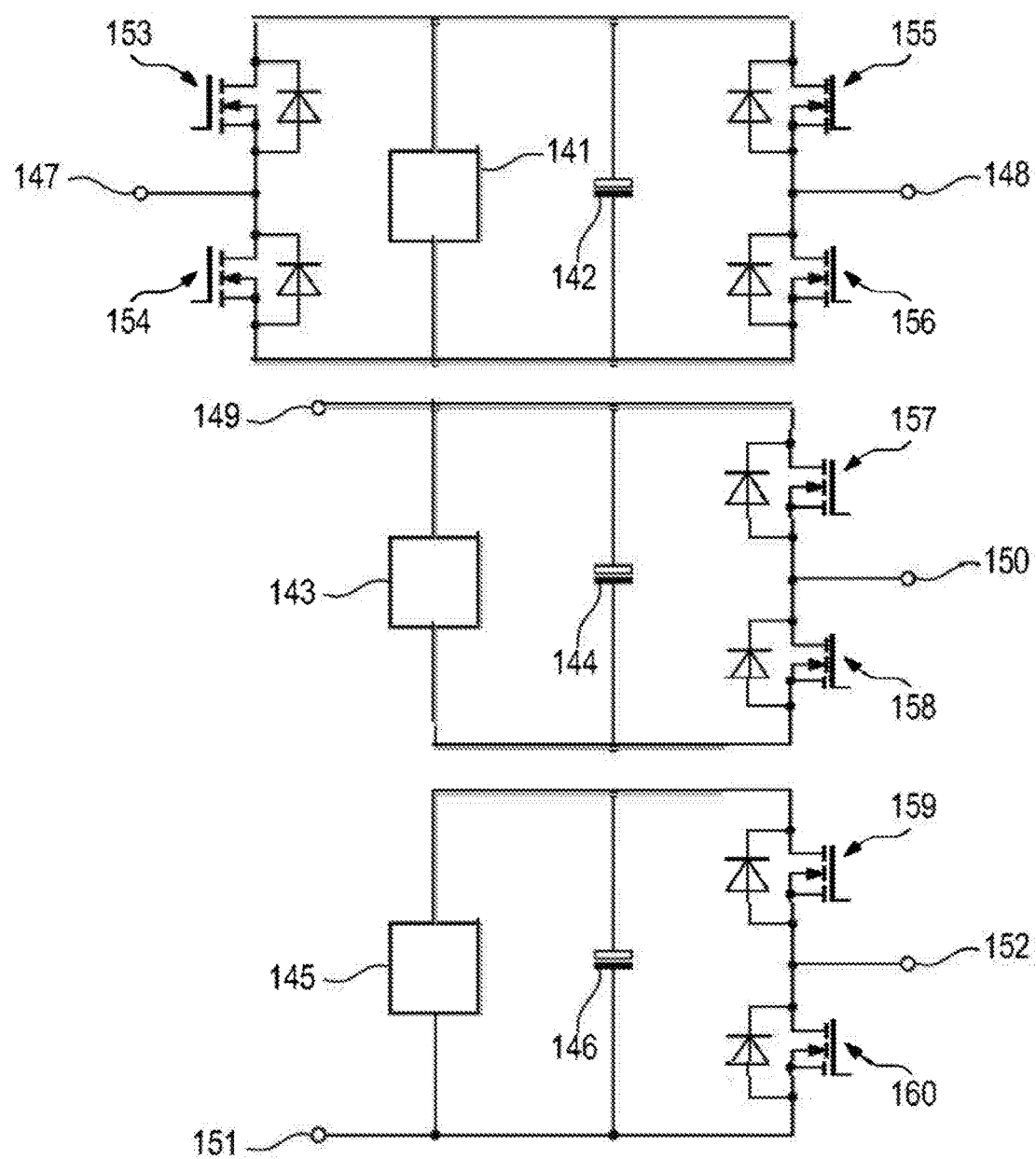
Prior Art  Fig. 1c

Prior Art  Fig. 1d

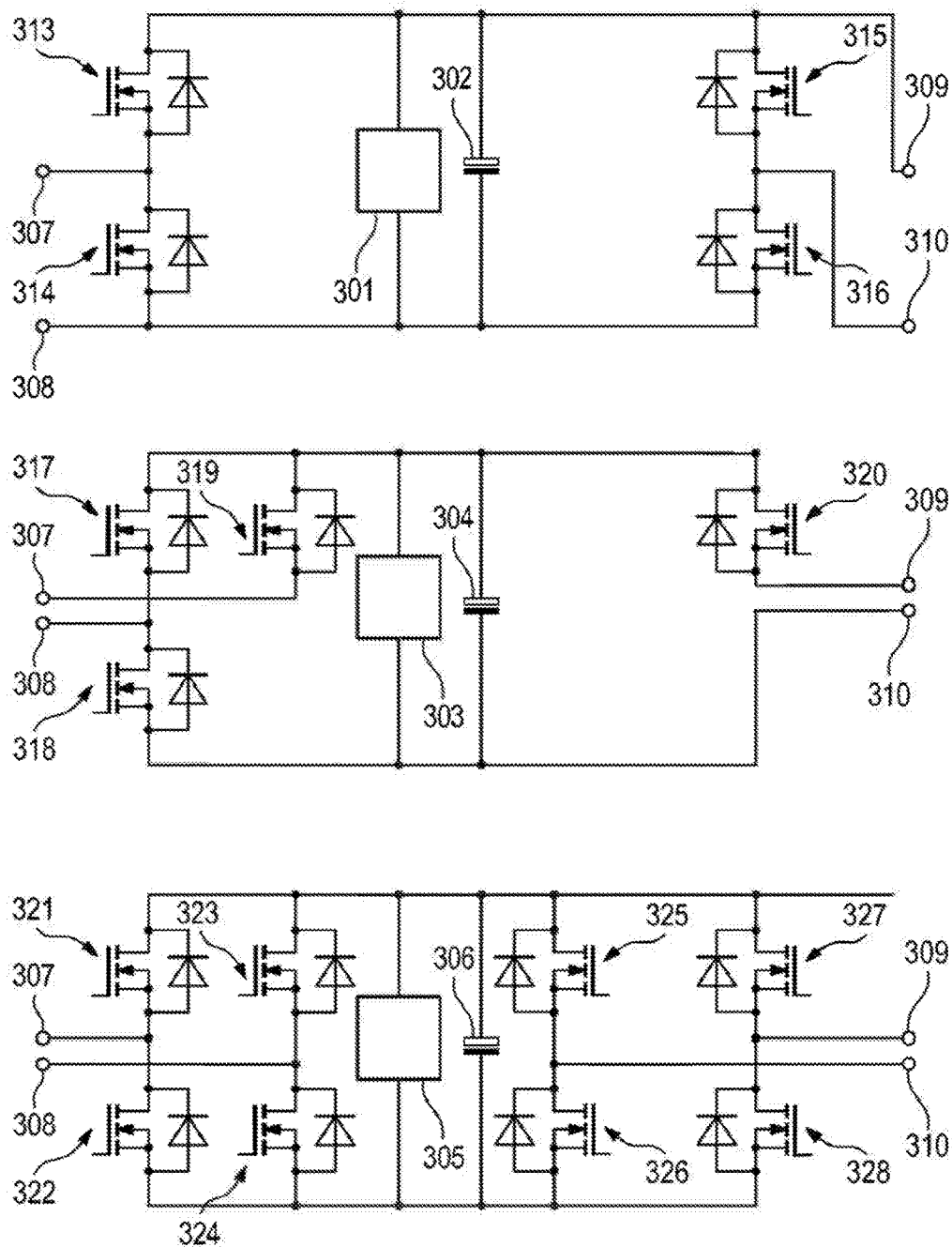
Prior Art  Fig. 2d

US 10,439,506 B2

MATRYOSHKA CONVERTER

CROSS-REFERENCE TO RELATED APPLICATIONS

This U.S. national phase patent application claims priority to PCT International Patent Application No. PCT/EP2016/025031, filed Apr. 4, 2016, which claims priority to German Patent Application No. DE 102015112513.7, filed Jul. 30, 2015, the content of each application being incorporated by reference herein in its entirety.

FIELD OF THE INVENTION

The invention relates to an electrical converter system comprising individual modules nested one inside another.

BACKGROUND OF THE INVENTION

Electric AC motors such as are employed in electric vehicles, for example, usually require a converter that converts the DC voltage provided by a battery into an AC voltage. Conventional converters in such vehicles use so-called bridge circuits that alternately connect output terminals to a positive and a negative pole of the DC voltage source. In each switching state, the converters choose the residence duration such that the demanded AC voltage arises on average over time. However, an AC voltage generated in this way has a low quality and distortion. In addition, high energy loses occur as a result of the switching processes. Further disadvantages occur in terms of the electromagnetic compatibility, since the high-frequency switching edges that arise as a result of the switching cause high energies to be emitted electromagnetically. Moreover, the circuits necessitate expensive components since the latter have to be designed in each case for the peak voltage.

The problems mentioned can be combated using modular multilevel converters. Modular multilevel converters are known inter alia from "A. Lesnicar, R. Marquardt (2003), An innovative modular multilevel converter topology suitable for a wide power range, IEEE Power Tech Conference Proc., 3:6ff.", which is incorporated by reference herein, "M. Glinka, R. Marquardt (2005), A new AC/AC multilevel converter family, IEEE Transactions on Industrial Electronics, 52:662-669, which is incorporated by reference herein and "S. M. Goetz, A. V. Peterchev, Th. Weyh (2015), Modular multilevel converter with series and parallel module connectivity: topology and control, IEEE Transactions on Power Electronics, 30(1):203-215," which is incorporated by reference herein. Electrical converter systems are likewise known from DE 10 2011 108 920 A1, which is incorporated by reference herein and DE 10 2010 052 934 A1, which is incorporated by reference herein.

Modular multilevel converters allow the output voltage for a load, such as an electric AC motor, to be generated in small stages. In modular multilevel converters, individual modules each comprising an energy storage element and a plurality of switching elements are electrically interconnected with neighboring modules, wherein the electrical interconnection is dynamically freely variable during operation, such that the output voltage is generated by dynamically changing serial and parallel connection of the energy storage elements. The individual modules constitute extra-low-voltage sources which are hardwired among one another and which can be varied in terms of their voltage and can be electrically connected to the other extra-low-voltage sources. A multiplicity of arrangements of the switching elements and of the energy storage element have been developed for the individual modules. A respective arrangement of the energy storage element and the switching elements is referred to as a microtopology.

However, modular multilevel converters in the prior art can only dynamically interconnect neighboring modules with one another. By contrast, an arbitrary parallel and serial connection of the electrical energy storage elements of the modules is not possible if the important advantage that the design voltage of the individual components must be only a fraction of the total output voltage is maintained. This gives rise to disadvantages during operation and in terms of the loss behavior of such circuits. The chain structure of the macrotopology, in which modules are strung together in most converter technologies, additionally forces the load current of a converter arm, i.e. of a string of individual modules, to flow through all the modules, as a result of which the ohmic losses of the system are increased unnecessarily.

An omission of modules, particularly in the parallel connection, such that even non-adjacent modules can electrically connect their electrical energy storage elements in parallel among one another, without the omitted module having to be included in the process, is not possible in any technology from the prior art without having to give up in the process the reduced dielectric strength possible for a large portion of the components.

Moreover, other functions, such as e.g. an energy equalization of modules that are not directly adjacent, cannot be realized or can be realized only with high additional circuitry outlay. Furthermore, this requires a high number of semiconductor elements that are usually used because each individual module has to provide all the switching states. The control of large converters comprising a large number of individual modules also poses a problem because all the modules generally have to be driven by a central control.

Hereinafter the term "electrical energy storage element" is intended also to include electrical energy sources and energy sinks which differ from electrical energy storage elements merely in that they preferably enable one area of operation, either an energy uptake or an energy delivery. Furthermore, the electrical energy storage elements designated here need not necessarily be ideal and therefore free of losses, and so the energy that can be drawn may be lower than that previously fed in.

A power converter generally denotes an electrical circuit which can transport electrical energy between a plurality of inputs and in the process affords the possibility of converting current and/or voltage parameters. This includes, in particular, DC-DC converters, inverters and rectifiers.

SUMMARY OF THE INVENTION

One object that is intended to be achieved by the present invention consists, inter alia, in enabling a parallel connection of modules that are not directly adjacent.

The object is achieved by means of an electrical converter comprising a plurality of modules nested one inside another and having at least two nesting levels, wherein at least one embedding module of a first nesting level is provided that comprises at least two electrical terminals and an energy string, wherein the energy string comprises at least two mutually interconnected embedded modules of an at least second next deeper nesting level, such that the modules are embedded one inside another, wherein the modules each comprise a plurality of switching elements for dynamically switching between a plurality of circuit state between at least two modules of a nesting level. Further configurations can be gathered from the dependent claims and the description.

M2Cs (Modular Multilevel Converters), M2SPCs (Modular Multilevel Serial-Parallel Converters) and switched-capacitor converters generally utilize, as the basic structure, a concatenation of similar subcircuits that can be supplemented by further elements, for example serially adjacent circuits, circuits in parallel with the basic structure or circuit elements connecting different nodes of the basic structure. In this case, that part of the circuit which is repeated at least once, called "module" or "individual module" hereinafter without restricting the generality, need not be repeated structurally identically, but has functional similarity. Two modules generally already exhibit such a similarity if both can represent at least two so-called circuit functions or circuit states of the same type.

According to the present invention, proceeding from an arbitrary known microtopology of an individual module or module, an energy storage element within this microtopology of the individual module is replaced by a further individual module. A multilevel connection of known individual modules is made possible as a result. In other words, individual modules are embedded into individual modules or nested one inside another. In this case, the known module topologies can be used both as embedding module and as embedded module. As a result, individual modules or modules no longer contain only an energy storage element having a fixed behavior, but rather embedded modules which themselves can be dynamically altered in terms of their properties. As a result, a significantly higher flexibility in the interconnection of the energy storage elements of the individual modules is produced, without significantly increasing the circuitry outlay. A multidimensional converter system is thus present, whereby individual modules that are not directly adjacent can be connected in parallel with one another.

The electrical converter system according to aspects of the invention comprises a plurality of modules nested one inside another and having an arbitrary number of nesting levels. One module of the plurality of modules comprises at least two terminals and an energy string. The energy string comprises at least one energy storage element and/or at least two modules which are associated with a next deeper nesting level. In order to be able to realize a nesting, at least one module of the plurality of modules must comprise at least two modules embedded into the at least one module instead of an energy storage element in the energy string.

At least two modules of a nesting level are interconnected with one another. To that end, the modules comprise a plurality of switching elements which dynamically switch between a plurality of circuit states between the at least two modules of a nesting level. Circuit states in this sense are e.g. parallel connection, serial connection, bypass connection and passive connection with regard to the energy storage elements of the respective individual modules or modules.

All known module circuits, so-called microtopologies or module topologies, of modular converters, for example modular multilevel converters such as the M2C or the M2SPC and switched-capacitor converters, can be used as embedding modules. For embedding modules, at least one of the electrical energy storage elements is replaced by a macrotopology which itself contains at least two modules, for example a string of modules (converter arm, module string), a phase module or a number of phase modules interconnected with one another. Preferred module types for the embedding converter (matryoshka converter) are two-quadrant modules of the M2C (hereinafter called M2C-2q for short), four-quadrant modules of the M2C (often also referred to as chopper modules, hereinafter M2C-4q for short), short-circuit-protected M2C modules (hereinafter 4q-KGM2C for short), four-quadrant modules of the M2SPC (hereinafter M2SPC-4q for short), two-quadrant modules of the M2SPC (hereinafter M2SPC-2q for short), Marx converter modules (hereinafter MaM for short), and various switched-capacitor Modules.

In a further embodiment of the converter according to aspects of the invention, an embedded module of a deeper nesting level is electrically connected by exactly one electrical terminal to a positive busbar and/or a negative busbar of a module of a higher nesting level, i.e. an embedding module.

The switching speed of the entire system can be provided by the switching elements of the embedded modules. As a result, the switching elements of the modules of higher nesting levels can have slower switching speeds than the switching elements of modules of deeper nesting levels.

The highest voltage that occurs in a module is substantially the sum of the voltages of all the electrical energy storage elements of the directly embedded modules embedded more deeply over a plurality of levels. This has the consequence that, in one embodiment, the switching elements in deeper nesting levels of embedded modules can have a lower dielectric strength than the switching elements of modules of higher nesting levels.

As mentioned, previously known module topologies from modular multilevel technology can be used as embedding and/or embedded modules. Various variants can occur here. In this regard, in one embodiment of the converter according to aspects of the invention, the embedding modules and also the embedded modules can each have the same topology, wherein the module in the deepest nesting level is generally a so-called elementary module, which in its energy string does not comprise an additional embedded module string, but rather only at least one energy storage element.

Alternatively, in a further embodiment of the converter according to aspects of the invention, the embedding modules can also have a topology which is different than the topology of the embedded modules, wherein here, too, the module in the deepest nesting level is generally a so-called elementary module, which does not comprise an additional embedded module string, but rather only at least one energy storage element.

As a further alternative, in yet another embodiment of the converter according to aspects of the invention, the modules of a module string of a nesting level can also each have different topologies, wherein here, too, the module in the deepest nesting level is generally a so-called elementary module, which does not comprise an additional embedded module string, but rather only at least one energy storage element.

The invention also proposes a method for providing an electrical converter system, wherein an electrical circuit having at least two nesting levels is used, wherein at least one embedding module of a first nesting level is used to form at least one energy string, wherein at least two embedded modules of an at least second next deeper nesting level are interconnected with one another, such that the modules are embedded one inside another, wherein in the modules at least two terminals and a plurality of switching elements are used in order to be able to dynamically switch between a plurality of circuit states between at least two modules of a nesting level.

In one embodiment of the method according to aspects of the invention, switching elements used in higher nesting levels have slower switching speeds than switching elements used in deeper nesting levels.

In a further embodiment of the method according to aspects of the invention, switching elements used in deeper nesting levels have a lower dielectric strength than switching elements used in higher nesting levels.

In yet another embodiment of the method according to aspects of the invention, switching elements not having a commutation capability are used in higher nesting levels.

In one embodiment of the method according to aspects of the invention, at least one module is used in which the at least one energy string comprises at least one energy storage element.

In a further embodiment of the method according to aspects of the invention, at least one module is used in which the at least one energy string comprises only at least one energy storage element.

Further advantages and configurations of the invention are evident from the description and the accompanying drawings.

It goes without saying that the features mentioned above and those yet to be explained below can be used not only in the combination respectively indicated, but also in other combinations or by themselves, without departing from the scope of the present invention.

BRIEF DESCRIPTION OF THE DRAWINGS

The invention is illustrated schematically on the basis of embodiments in the drawing and is described schematically and thoroughly with reference to the drawings.

FIG. 1c and FIG. 1d illustrate module topologies of different modular multilevel converter variants.

FIG. 2d three exemplary microtopologies for application in a modular multilever converter with serial and parallel switching variants.

DETAILED DESCRIPTION OF THE INVENTION

The electrical converter system according to aspects of the invention utilizes a dynamic change in the electrical interconnection of electrical energy storage elements such as, for example, inductances, capacitors and battery cells or energy sources for generating variable output voltages and/or for transferring energy between said electrical energy storage elements or energy sources. Therefore, the converter system according to aspects of the invention also relates to so-called M2C, M2SPC and switched-capacitor circuits.

M2C and M2SPC circuits are modular multilevel converter circuits, wherein M2SPC circuits enable a serial and parallel switching variant of the electrical energy storage elements. The circuits mentioned are of modular design, that is to say that they consist of a plurality of modules interconnected with one another, wherein the modules usually comprise an electrical energy storage element and at least one electronic switching element. By means of suitable activation of the switching elements of the individual modules, the energy storage elements can be electrically connected in series and/or electrically connected in parallel with other modules, generally the neighbors, and/or be electrically isolated from other modules. Depending on the embodiment of the modules, these electrical connections can be performed individually for the respective energy storage elements.

Figure 1A:
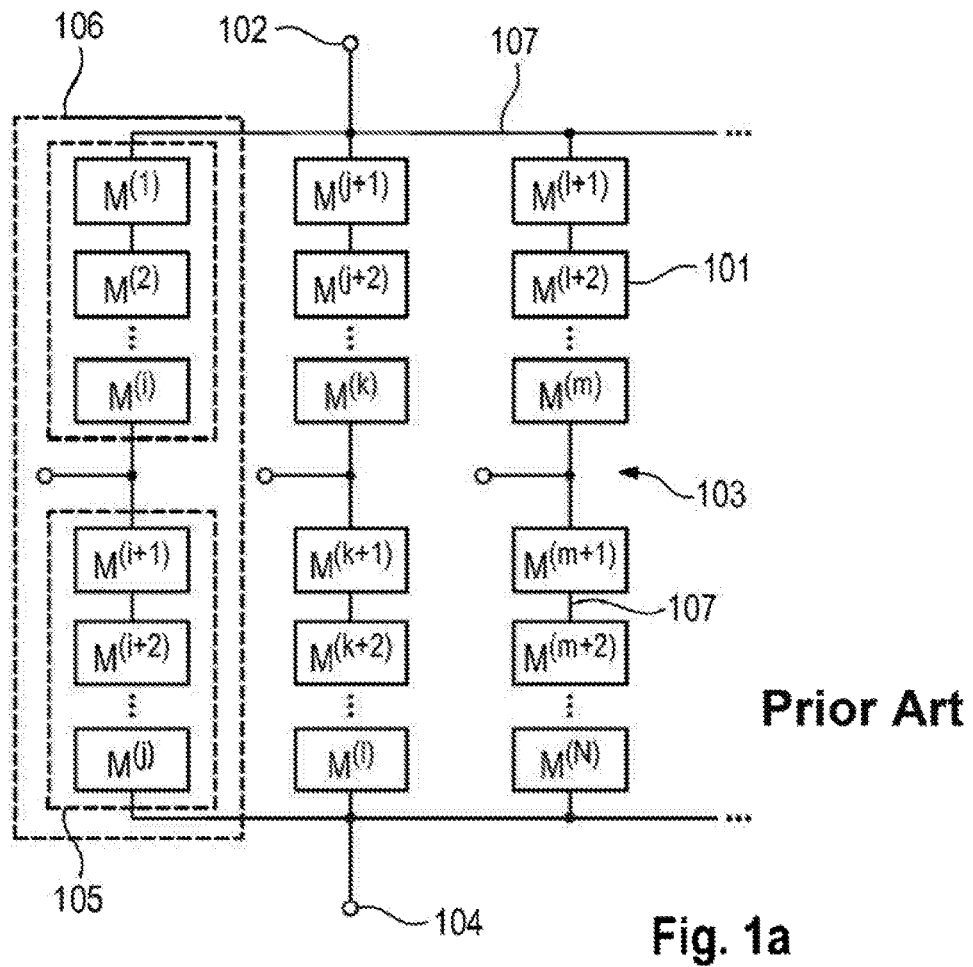
FIG. 1a shows a converter circuit from the prior art.

FIG. 1a shows a converter circuit from the prior art, the basic principle of which is based on the interconnection of similar modules 101, including in particular the M2C, the M2SPC and also modifications and further developments of these two fundamental technologies through the use of alternative module circuits, so-called microtopologies, which, either unmixed or in combination with one another, form a modular converter. The circuit shown in FIG. 1a comprises a plurality of terminals 102, 103, 104, to which further circuit components or modules can be linked. A series connection of at least two modules 101 is referred to as a module string 105 or converter arm. The individual modules 101 or the module strings 105 are connected to one another via electrical connections 107. A plurality of module strings 105 are referred to as a phase module 106.

Figure 1B:
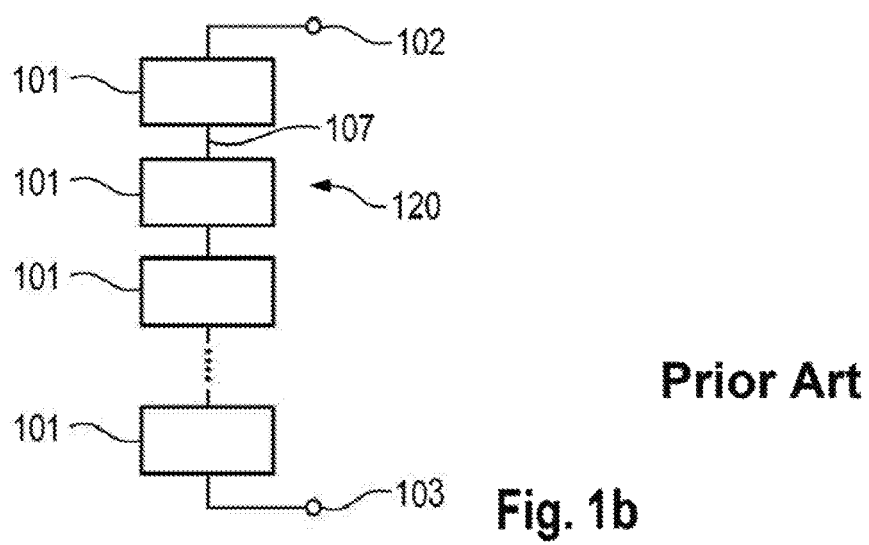
FIG. 1b shows an exemplary module string from the prior art.

FIG. 1b shows, in an enlarged view, a module string 120 comprising a plurality of modules 101 and two terminals 102, 103. A module string consists of at least two individual modules 101 interconnected with one another via electrical connections 107. An upper limit is not imposed here, but rather usually arises from the requirements of the circuit.

FIGS. 1c and 1d show so-called microtopologies. Microtopologies designate the internal circuits of individual modules. The microtopologies shown illustrate various M2C variants. In the case of M2C circuits, the electrical energy storage element 142, 144, 146 can either be connected in series with corresponding electrical energy storage elements of an adjacent module or be removed from the circuit. The topmost circuit in FIG. 1c comprises the switching elements 153, 154, 155, 156, each comprising a transistor and a diode, and thus enables a so-called four-quadrant circuit in which it is possible to switch between two polarities at the terminals 147, 148. The middle and bottom circuits show so-called two-quadrant circuits, in which only ever one polarity can be present at the respective terminals 149 and 151 as a result of the switching of the respective switching elements 157, 158 and 159, 160. Furthermore, the microtopologies comprise damping elements 141, 143, 145, for example.

FIG. 1d shows a further microtopology of an M2C circuit comprising two electrical energy storage elements 172 and a plurality of switching elements 183, 184, 185, 186, 187 and also the terminals 177, 178.

Figure 1E:
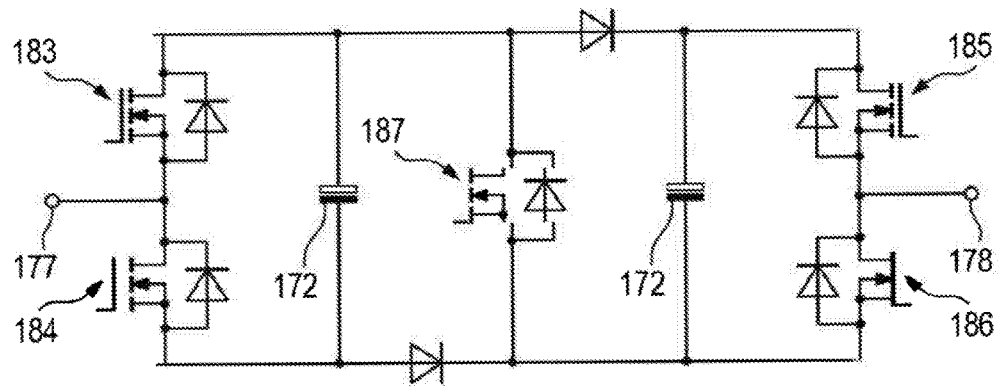
FIG. 1e shows an exemplary interconnection of two modules.
Figure 1E:
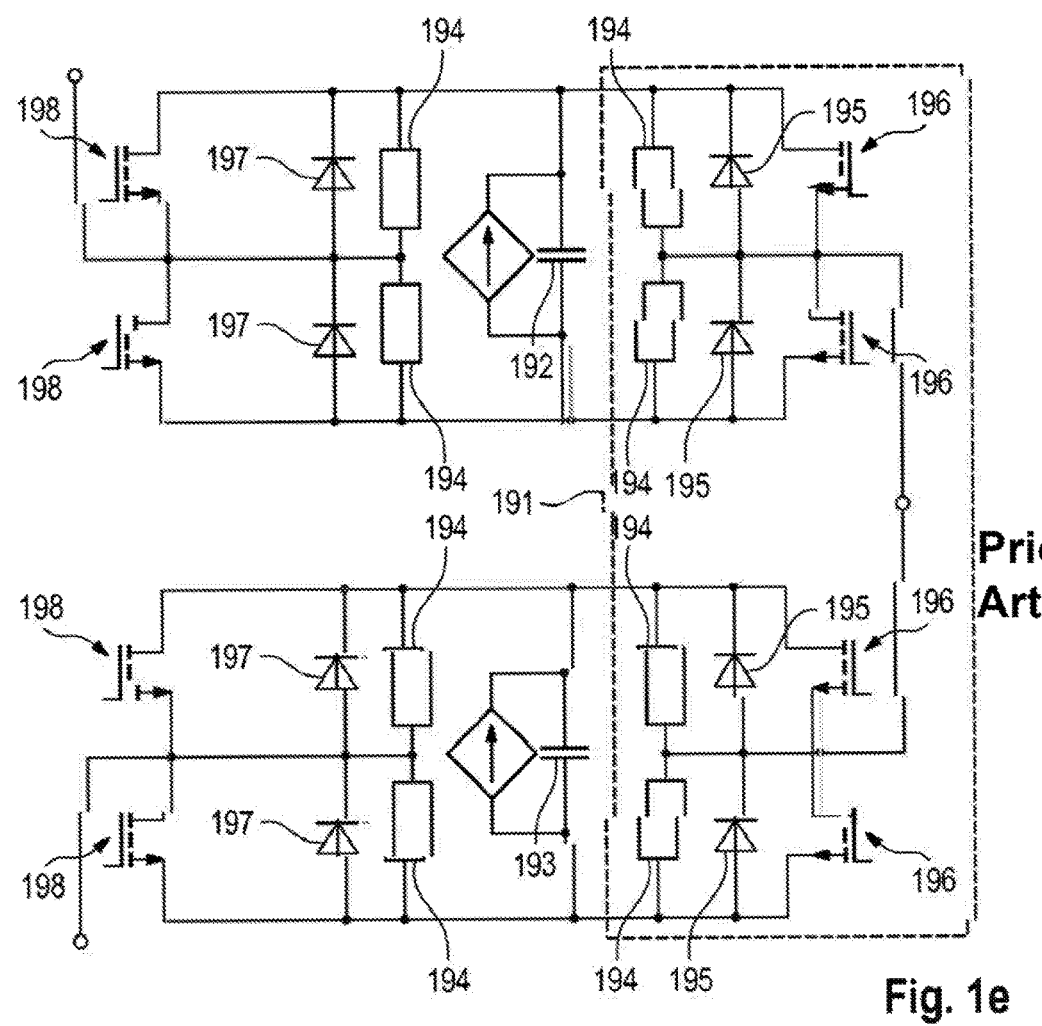

FIG. 1e shows an interconnection of two microtopologies. The respective modules comprise in each case a capacitor 192, 193, and also in each case four damping elements 194. That part of the interconnection which is enclosed by a dashed line is referred to here as a half-bridge 191. Furthermore, the microtopologies shown comprise diodes 195, 197 and transistors or switching elements 196, 198.

Figure 1F:
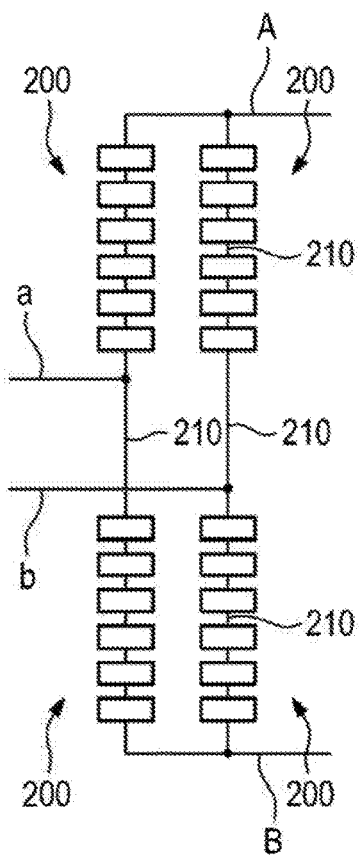
FIG. 1f shows an interconnection of a plurality of modules to form a module string and an interconnection of a plurality of module strings with four electrical terminals.
Figure 1G:
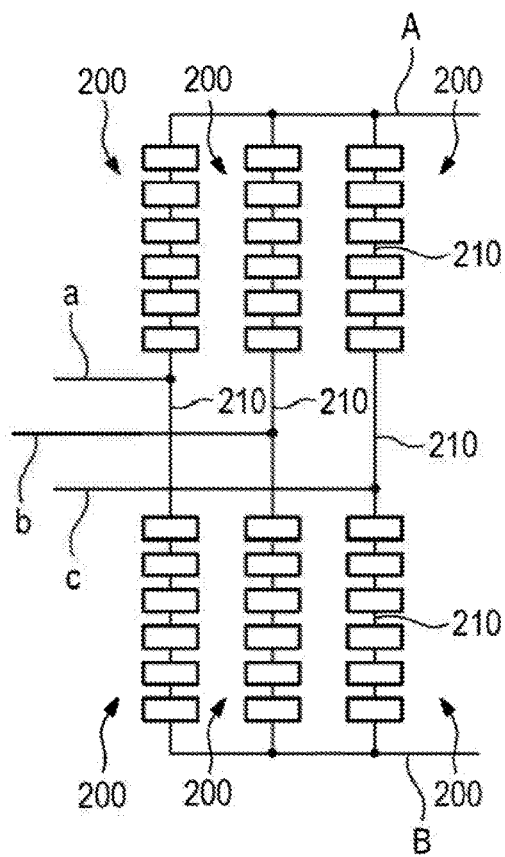
FIG. 1g shows an interconnection of a plurality of module strings with five electrical terminals.

FIGS. 1f and 1g each show a macrotopology. A macrotopology denotes an interconnection of a plurality of modules or module strings 200 with one another. The modules or module strings 200 are connected to one another via electrical connections 210. The macrotopology shown in FIG. if comprises four electrical terminals a, b, A, B, which can form for example, but not exclusively, two terminal pairs a, b and A, B, each pair (a, b), (A, B) of which can form a DC and/or AC terminal, for e.g. at least one electrical load, at least one electrical grid or at least one electrical machine.

The macrotopology shown in FIG. 1g comprises electrical terminals a, b, c, A, B, which can be assigned for example to a terminal pair A, B and a three-phase terminal a, b, c. Furthermore, it is also possible for more than five electrical terminals to be formed.

Figure 1H:
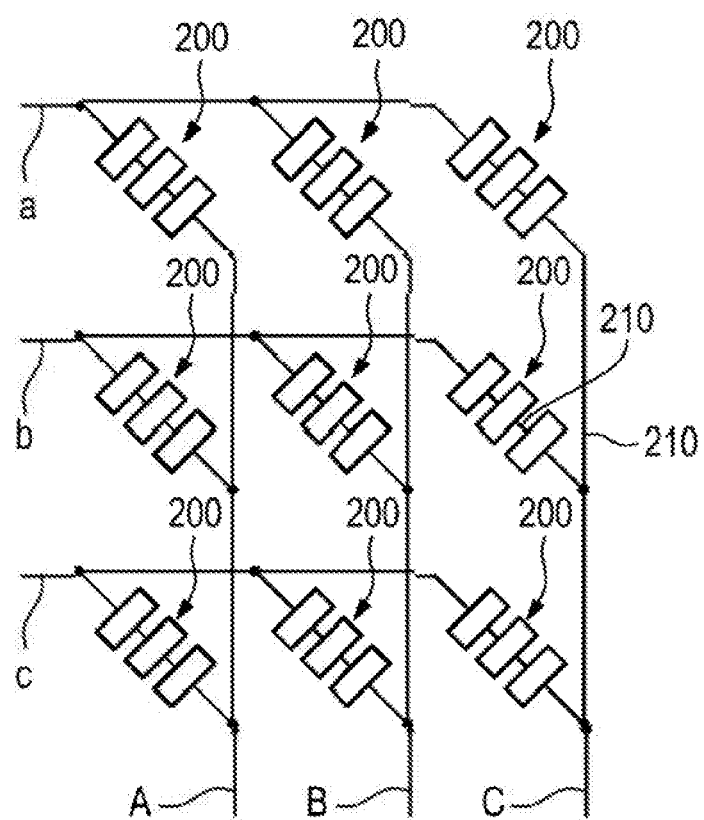
FIG. 1h shows a matrix interconnection between six electrical terminals.

FIG. 1h shows a matrix interconnection between six electrical terminals a, b, c, A, B, C, wherein two of said terminals are connected via in each case at least one module string 200. The modules or module strings 200 are connected to one another via electrical connections 210. In so-called sparse matrix converters, some of these connections between respective terminals are omitted.

Figure 2A:
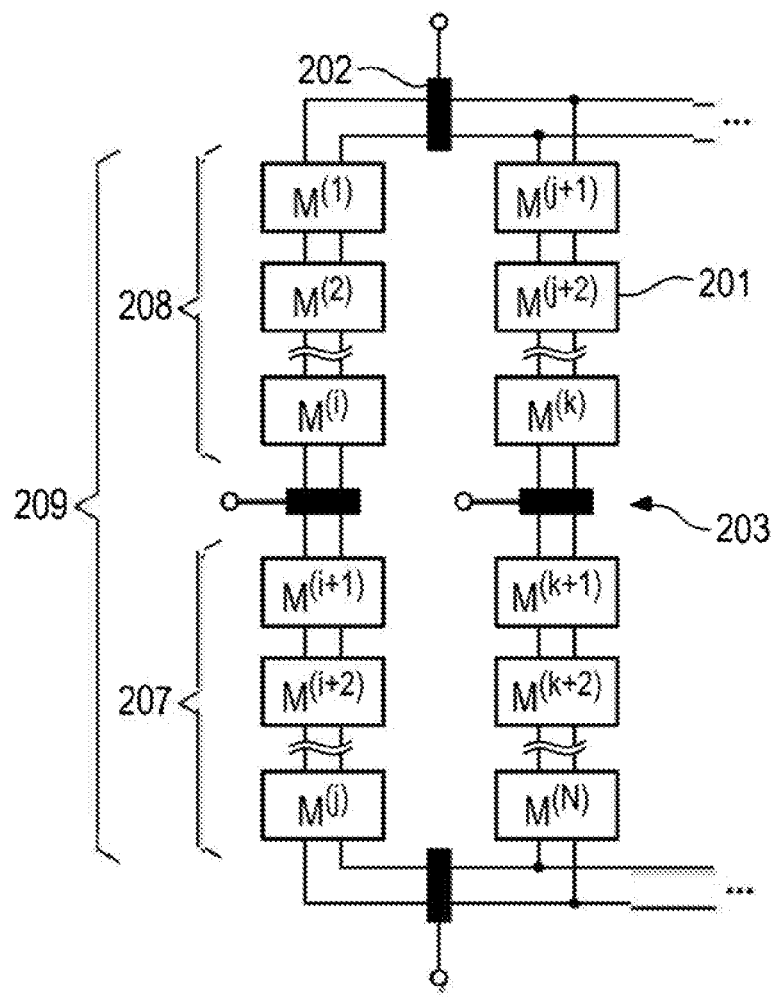
FIGS. 2a and 2b show exemplary macrotopologies for a modular multilevel converter with serial and parallel switching variants.
Figure 2B:
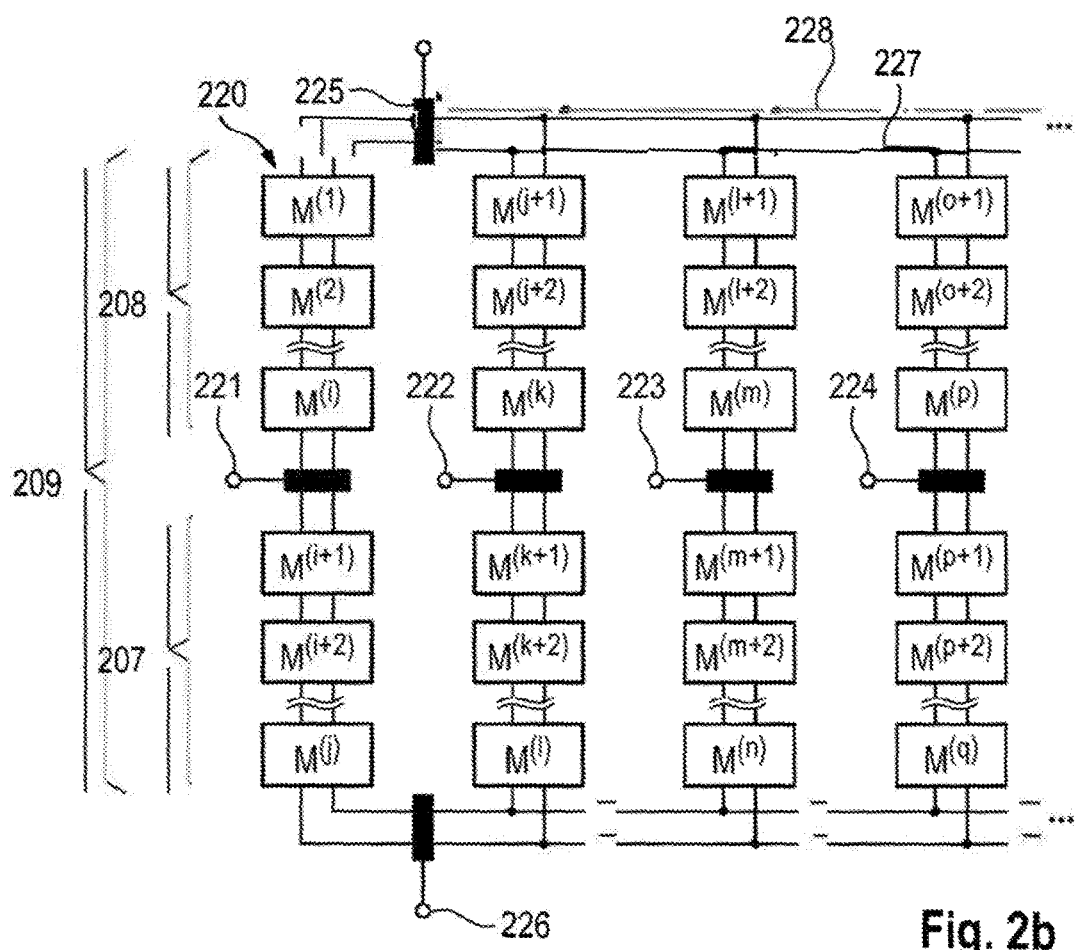

FIGS. 2a and 2b show exemplary macrotopologies for M2SPC modules, FIG. 2b being an extension of the topology from FIG. 2a. M2SPC modules enable a serial connection and a parallel connection of respective energy storage elements of adjacent modules. The macrotopologies comprise modules 201, 220, wherein a series connection of a plurality of modules 201, 220 forms a module string 207, 208, which can be combined to form a phase module 209. A respective terminal 203, 221, 222, 223, 224 is formed between two respective module strings 207, 208. The macrotopologies shown in FIGS. 1a and 1f to 1h can likewise be used here if the electrical connections 107 and 210 between the modules 101 and module strings 105 and 200, respectively, were extended to two electrical connections, such as e.g. in FIG. 2b the electrical connections 227, 228 between the M2SPC modules 201. In addition, the macrotopology in FIG. 2b comprises terminals 225 and 226.

Figure 2C:
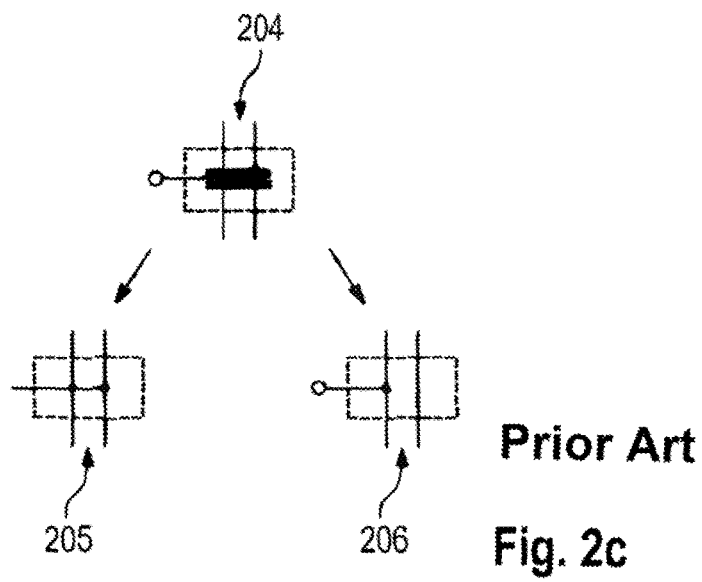
FIG. 2c shows exemplary types of electrical terminals.

FIG. 2c shows merely in what ways electrical terminals 204, 205, 206 can be formed. In this case, the terminal 204 may also be present in the embodiments 205 or 206.

FIG. 2d shows three exemplary M2SPC microtopologies from the prior art. The topologies each comprise an energy storage element 302, 304, 306 and also the switching elements 313 to 328. Each module comprises on each side respectively two terminals 307, 308, 309, 310 and respectively an exemplary damping element 301, 303, 305. The topologies shown represent prior art and can be used in a converter system according to aspects of the invention.

Figure 2E:
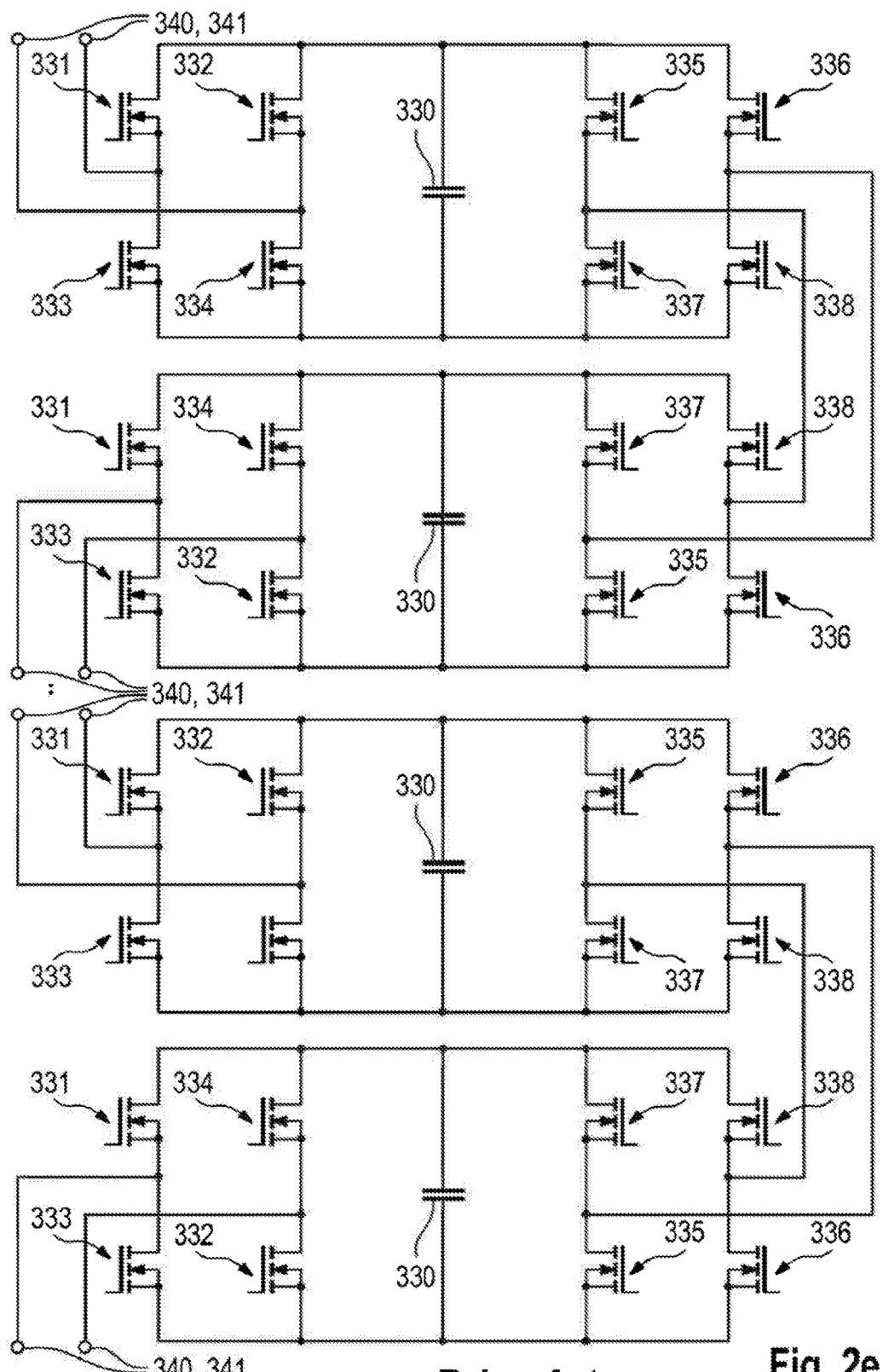
FIG. 2e shows an exemplary interconnection of M2SPC modules to form a converter arm.

FIG. 2e shows an exemplary interconnection of a plurality of modules to form a module string. The module string comprises, inter alia, the terminals 340, 341 that can be connected to an adjacent module. A module comprises an energy storage element 330, such as a capacitor, for example, and also the switching elements 331 to 338, which enable a four-quadrant circuit of the M2SPC module (M2SPC-4q).

Figure 3:
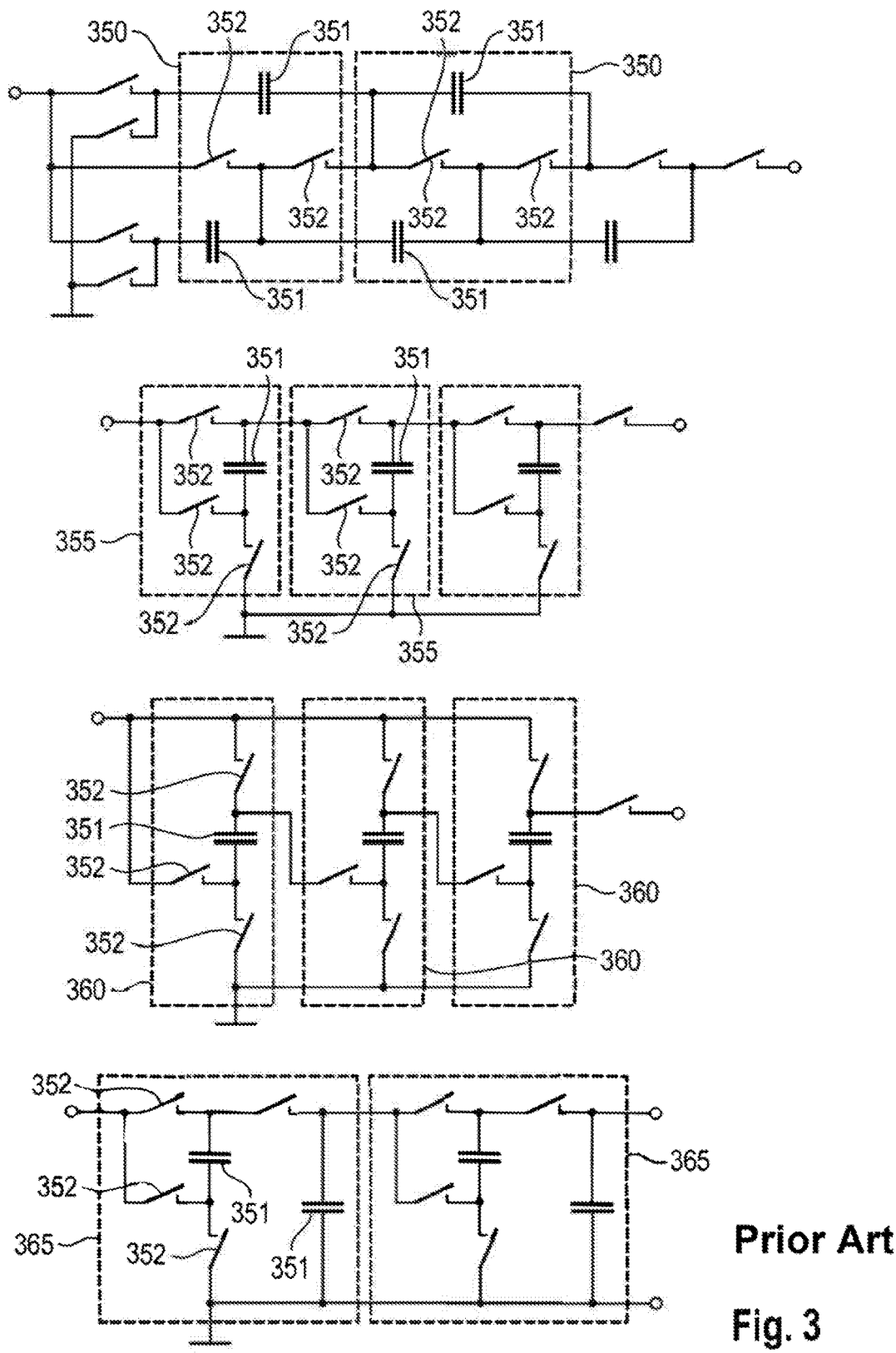
FIG. 3 shows typical switched-capacitor converter circuits from the prior art.

FIG. 3 illustrates typical switched-capacitor converters from the prior art. These circuits generally likewise have a certain modularity as a result of similar subcircuits 350, 355, 360, 365 being repeated. The subcircuits or modules 350, 355, 360, 365 shown comprise in each case at least one energy storage element 351 and in each case at least two switching elements 352.

The microtopologies from the prior art as shown in the FIGS. above can be used for an electrical converter system according to aspects of the invention. A microtopology as presented in the patent application from the same applicant, entitled "Individual module, electrical converter system and battery system", which was filed on the same date, can likewise be used for a converter system according to aspects of the invention.

Figure 4:
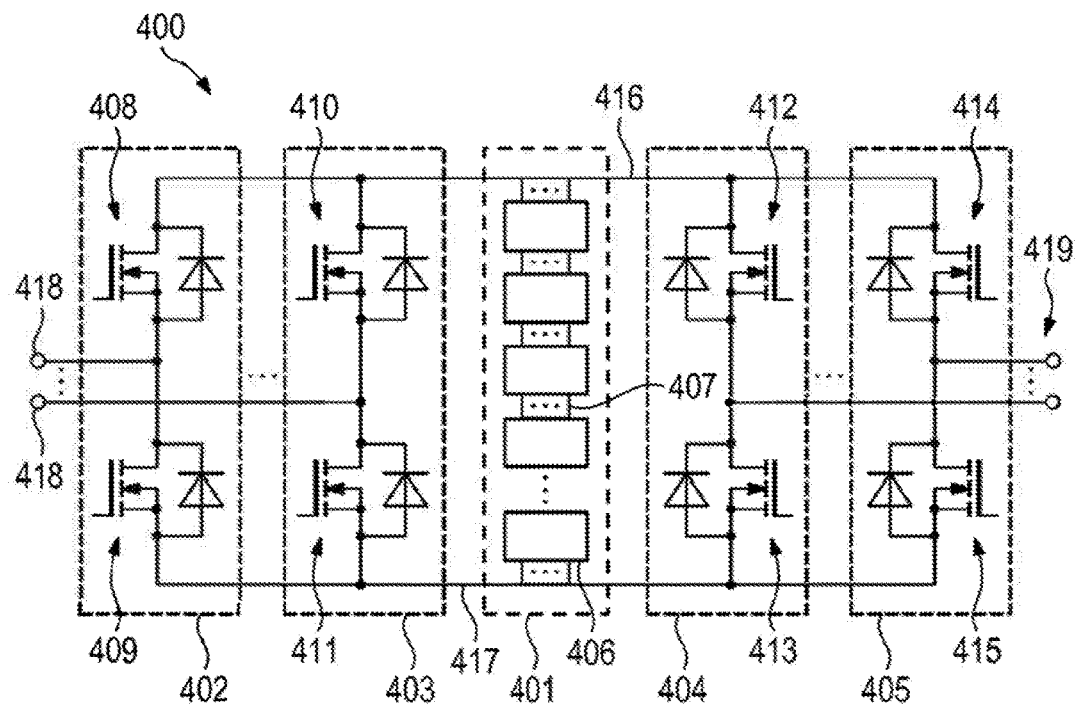
FIG. 4 shows one embodiment of a module of an electrical converter system according to aspects of the invention.

FIG. 4 shows one embodiment of an embedding module 400 according to aspects of the invention of the converter system according to aspects of the invention. The previous one-dimensional module macrotopology is extended by at least one level as at least one additional nesting level. Said at least one additional nesting level forms as a result of the introduction of embedding modules 400 (so-called nesting modules), which are identical to previously known modules in so far as they likewise assume module states with the aid of a plurality of switching elements 408, 409.410, 411, 412, 413, 414, 415 and can connect at least two internal power busbars 416, 417 to the external terminals or module terminals 418, 419 in different alternatives, and can thereby switch dynamically between at least two modules of a nesting level. However, they are different from their respectively most similar known modules from the prior art since, instead of at least one electrical energy storage element, they themselves comprise at least one module string 401 (converter arm) comprising at least two modules 406 (so-called embedded modules, also nested modules). In this case, each module 400, 406 can be either a conventional module comprising at least one electrical energy storage element, or an embedding module 400, which again contains a module string 401 or converter arm instead of at least one electrical energy storage element. The number of levels in some or all embedding modules 400 can be increased arbitrarily in accordance with the technical requirements.

By means of the module string 401, further modules 406 are embedded into the module 400. In this case, the module 406 constitutes a first, here highest, nesting level, while the modules 406 of the module string 401 form a next deeper nesting level. The module string 401 comprises a plurality of modules 406, which are connected to one another via at least two electrical connections 407. The embedded modules 406 can in turn have the topology of the embedding module 400, with a further module string 401 that embeds further modules 406, such that a further deeper nesting level is formed. The module string 401 or a branch having an energy storage element instead of the module string 401 forms the energy string of the module 400.

In order to enable a parallel connection of modules 400 that are not directly adjacent, at least two electrical connections 407 between the modules 406 are necessary, although more than two electrical connections 407 may also be present. The switching elements 408 to 415 are configured in pairs as half-bridges 402 to 405, wherein said half-bridges are optional. The diodes in the switching elements 408 to 415 are also optional. If, by way of example, only a polarity reversal of the polarity at the terminals 418, 419 in the sense of a two-quadrant circuit is intended to take place, simple electrical switches, which are not necessarily semiconductor switching elements, are sufficient for the switching elements 408 to 415.

The maximum required dielectric strength of each switching element 408 to 415 is upwardly limited on account of the chosen structure of the switching element 408 to 415 and may be accordingly far less than the voltage at the terminals 418, 419 of the converter. If all module switching states of the embedded modules 406 are intended to be permitted, the highest voltage and thus the necessary dielectric strength of the semiconductors used in the embodiment shown for the corresponding embedding module 400 is the sum of the voltages of all the electrical energy storage elements of the directly embedded modules 406 and of modules 406 embedded more deeply over a plurality of levels. Although the required dielectric strength must generally be higher for switching elements in embedding modules 400 compared with the associated embedded modules 406 and the necessary dielectric strength thus increases the higher up toward the topmost embedding modules 400 one goes in the nesting levels, the converter system according to aspects of the invention affords diverse advantages which nevertheless lead to less stringent requirements made of the semiconductors in embedding modules 400 and thus to lower semiconductor costs in the overall system.

The embedding converter, referred to as a matryoshka converter by the applicant, affords the advantage that the switching elements 408 to 415 of the embedding modules 400 or of modules at further higher nesting levels can be operated with low losses using so-called zero voltage switching or zero current switching. Furthermore, the switching elements 408 to 415 of the embedding modules 400 can have very slow switching speeds, far below those of embedded modules 406 in a deeper nesting level, without adversely affecting the speed of the overall system. Under particular conditions, the switching elements of embedding modules 400 or of modules at further higher nesting levels need not be capable of commutation. This applies to thyristors, for example, which are unable to interrupt a current flow.

All three options are achieved by means of a suitable driving of the modules 400, 406, in particular of the respective embedded modules 406. The switching elements 408 to 415 of the embedding modules 400 can have a lower switching speed than the switching elements of the embedded modules 406 and thus significantly reduce the costs since the switching speed of the overall system can be provided by the switching elements of the embedded modules 406. In the same way the required dielectric strength increases from the deepest nesting level upward or outward, the required switching speed decreases, without any loss of dynamic range in the overall system as a result. The control of such a system correspondingly carries out all required fast switching processes with embedded modules 406 and the switching elements thereof. By contrast, the control permits the switching elements 408 to 415 of the embedding modules 400 to perform only less frequent switching processes. Accordingly, slow switching elements 408 to 415 such as, for example, insulated-gate bipolar transistors (IGBT), gate-turn-off thyristors (GTO) or even mechanical switching elements such as relays can be used at higher nesting levels.

The forward voltage drop of IGBT, GTO and the like (generally on account of the pn junctures thereof) is insignificant here since for embedding modules 400 of an upper or outer level even in the case of unfavorable switching states there are only very few semiconductors in series in the current path.

As long as the state of charge of the embedded modules 406 is high enough, embedding modules 400 of higher nesting levels can use switching elements that are not capable of commutation. The embedded modules 406 can jointly commutate the current of the embedding module 400, such that the switching elements not capable of commutation attain the blocking state. The embedding module 400 can subsequently assume a new switching state.

If the current direction at the point in time at which the switching state of the embedding module 400 has to be changed and the current thereof thus has to be commutated is directed such that the corresponding embedded modules 406 are charged, the total voltage formed by the embedded modules 406 has to be increased by the control until the current has commutated and is thus extinguished. The control will generally achieve this by switching embedded modules 406 from a bypass state or from a parallel state into a serial state.

If the current direction is directed such that the corresponding embedded modules 406 are discharged, the total voltage formed by the embedding modules 400 has to be reduced until the commutation is achieved and the current is thus extinguished. The control will generally achieve this by switching embedded modules 406 from a serial state into a bypass or parallel state.

On account of such a regulation it is possible to use switching elements that are not capable of commutation, such as thyristors or triacs, for example. The necessary commutation is thus achieved by a kind of back EMF of the embedded modules 406 that causes the current to be extinguished. Thyristors as monodirectional switching elements, that is to say switching elements that conduct only in one direction, can be supplemented by either antiparallel thyristors or diodes. Antiparallel thyristors afford the advantage that the corresponding switching element is configured such that it is controllable in both directions. With the use of switching elements not capable of commutation in embedding modules 400, it may possibly be advantageous to use corresponding switching elements having a low reverse recovery effect. This significantly reduces the time during which it is necessary to wait until the commutation has taken place and the current has been extinguished.

Figure 5:
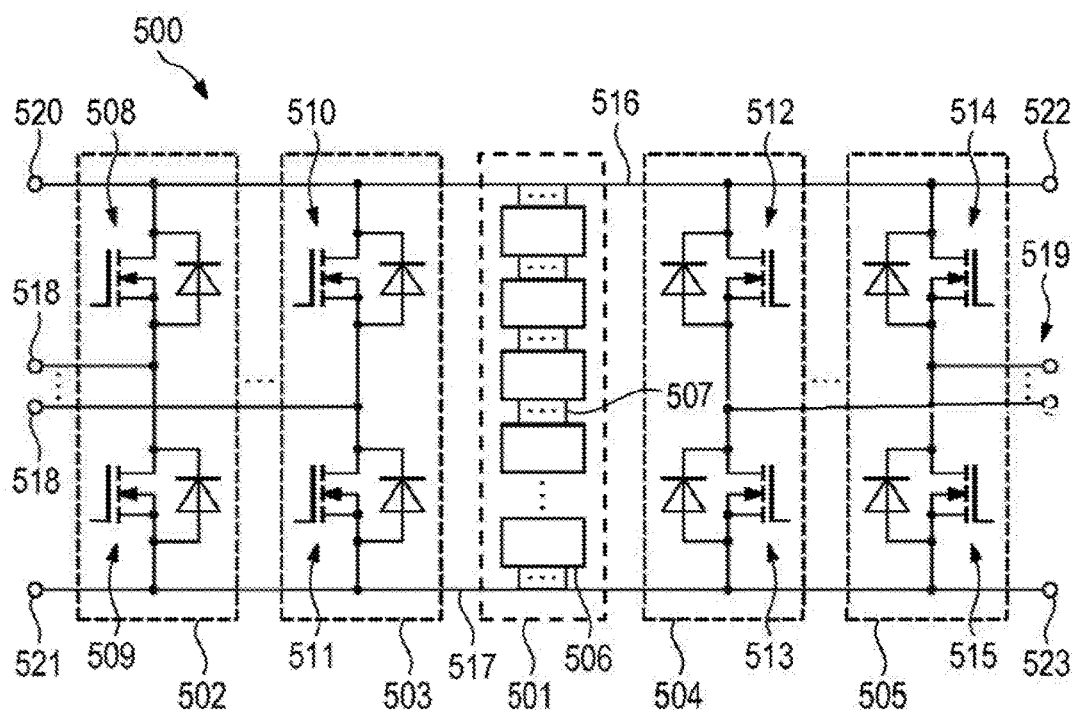
FIG. 5 shows a further embodiment of a module of an electrical converter system according to aspects of the invention.

FIG. 5 shows a further embodiment of an embedding module 500 according to aspects of the invention of the converter system according to aspects of the invention. In this case, identical reference numerals designate identical parts, but increased by one hundred with respect to FIG. 4. In addition, the converter system according to aspects of the invention comprises four additional terminals 520, 521, 522, 523. This embodiment thus represents a general embedding module 500 of the converter system according to aspects of the invention, from which all other embodiments, possibly yet to be shown below, can be derived by omission of individual elements.

Figure 6:
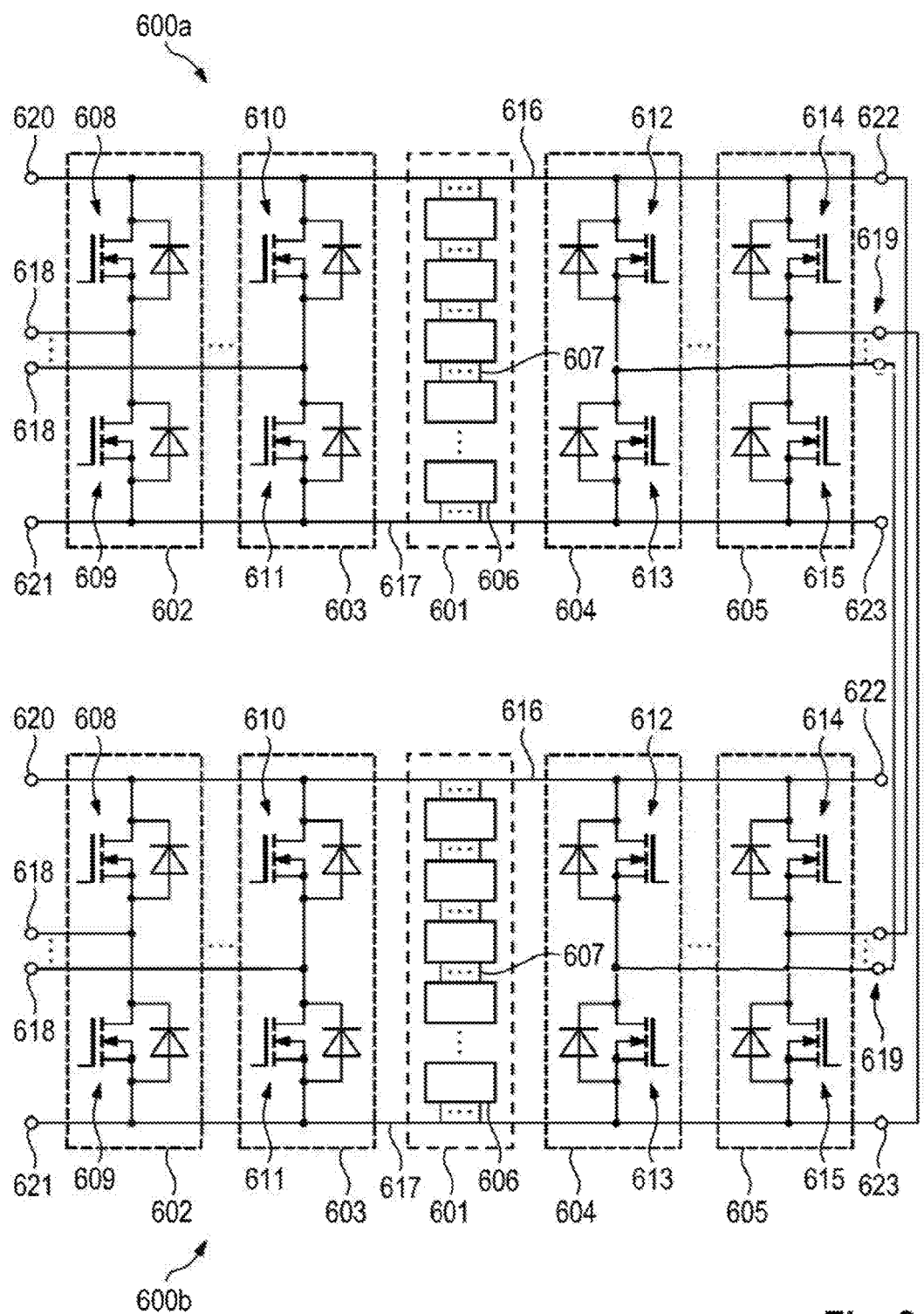
FIG. 6 shows a further embodiment of the converter system according to aspects of the invention comprising two embedding modules interconnected with one another.

FIG. 6 shows one embodiment of the converter system according to aspects of the invention comprising two interconnected embedding modules 600a, 600b having the topology of the module 500 from FIG. 5. In this case, the terminals 619 of the module 600a are connected to the terminals 619 of the module 600*b*. The terminal 622 of the module 600*a* is connected to the terminal 623 of the module 600*b*.

Figure 7A:
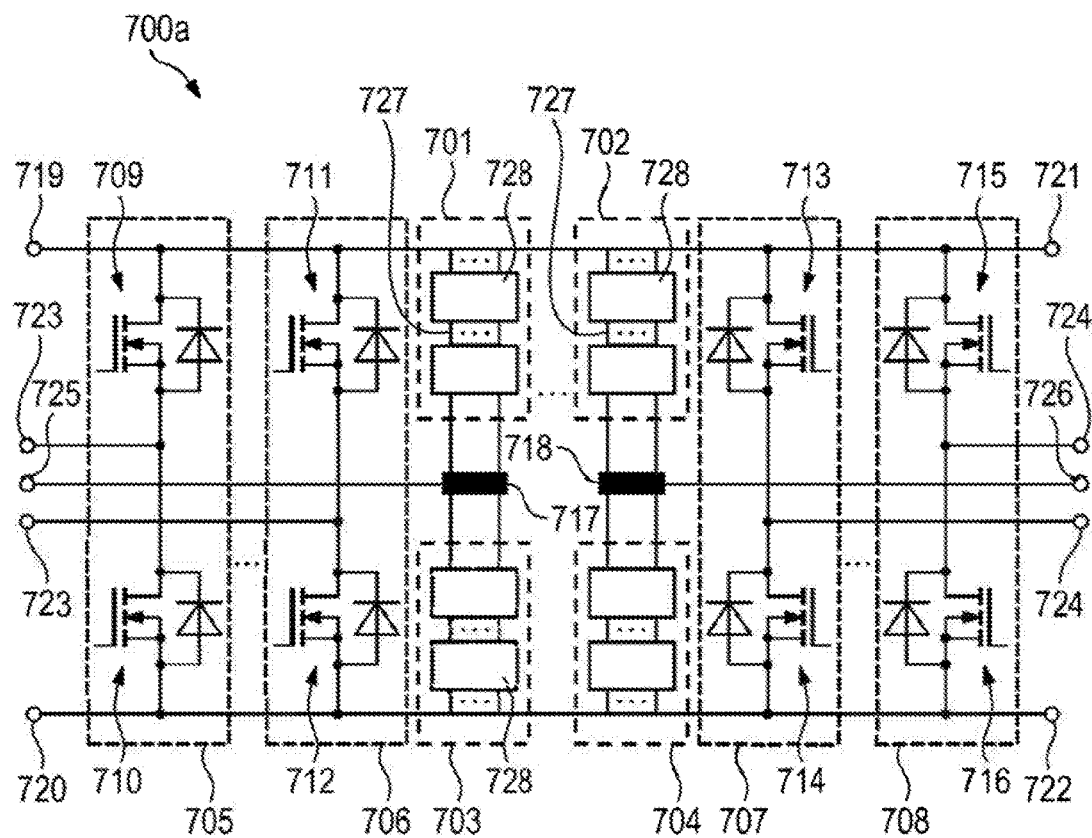
FIGS. 7a and 7b show further embodiments of the converter system according to aspects of the invention in which a module comprises more than one module string.

FIG. 7*a* shows a further embodiment of an embedding module 700*a* of the converter system according to aspects of the invention, comprising four module strings 701, 702, 703, 704 each consisting of at least two embedded modules 728. Electrical terminals 717 and 718 are inserted between two module strings 701, 703 and 702, 704, respectively, said electrical terminals respectively forming a further terminal 725 and 726 of the embedding module 700*a* on a respective side. The rest of the topology is identical to the topology of the module 500 from FIG. 5 comprising eight switching elements 709 to 716, each pair of which respectively forms half-bridges 705 to 708 with the terminals 723, 724, and the terminals 719 to 722 at the busbars. The number of components is not restricted to the numbers shown. By way of example, it is conceivable also to integrate more than the eight switching elements 709 to 716 shown into the circuit. Moreover, there may be more than two electrical connections 727 between the embedded modules 728.

Figure 7B:
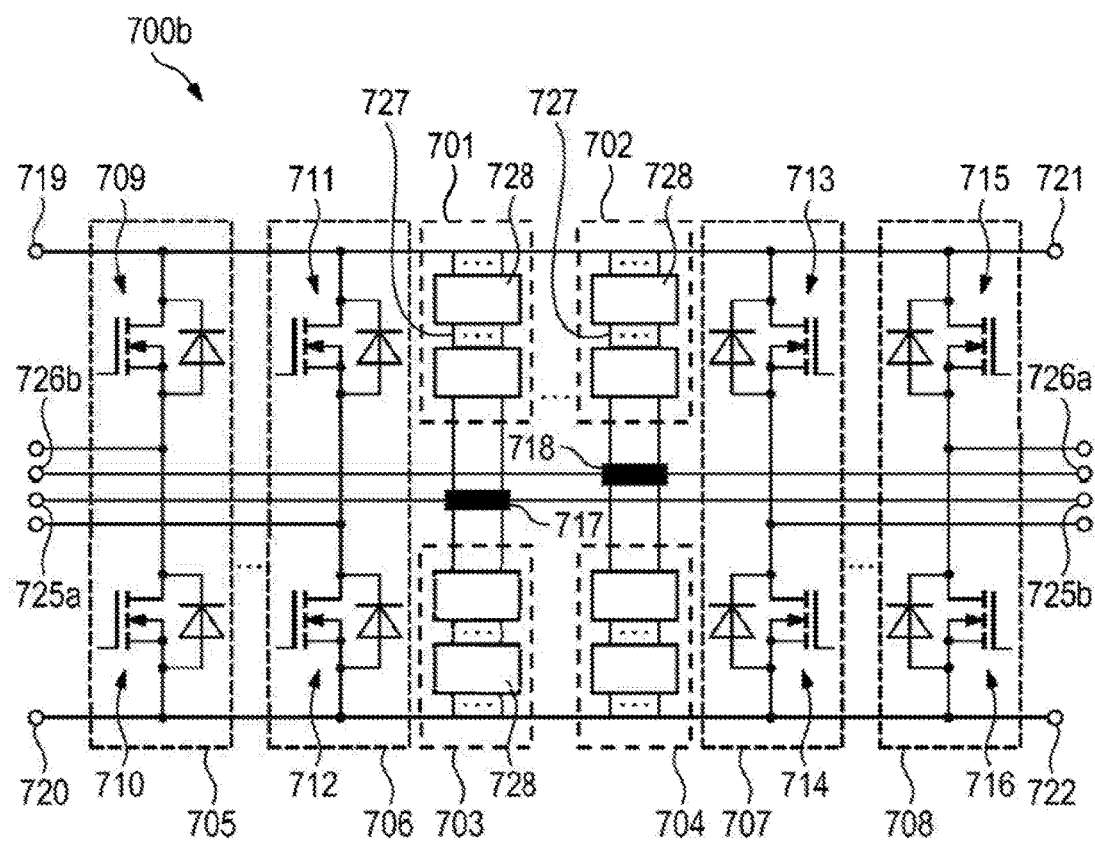

FIG. 7*b* shows a further embedding module 700*b* according to aspects of the invention, which is substantially identical to the module 700*a*, but wherein the electrical terminals 717 and 718 between in each case two module strings 701, 703 and 702, 704, respectively, in each case form a terminal 725*a*, 725*b* and 726*a*, 726*b*, respectively, on both sides of the module 700*b*.

Figure 8A:
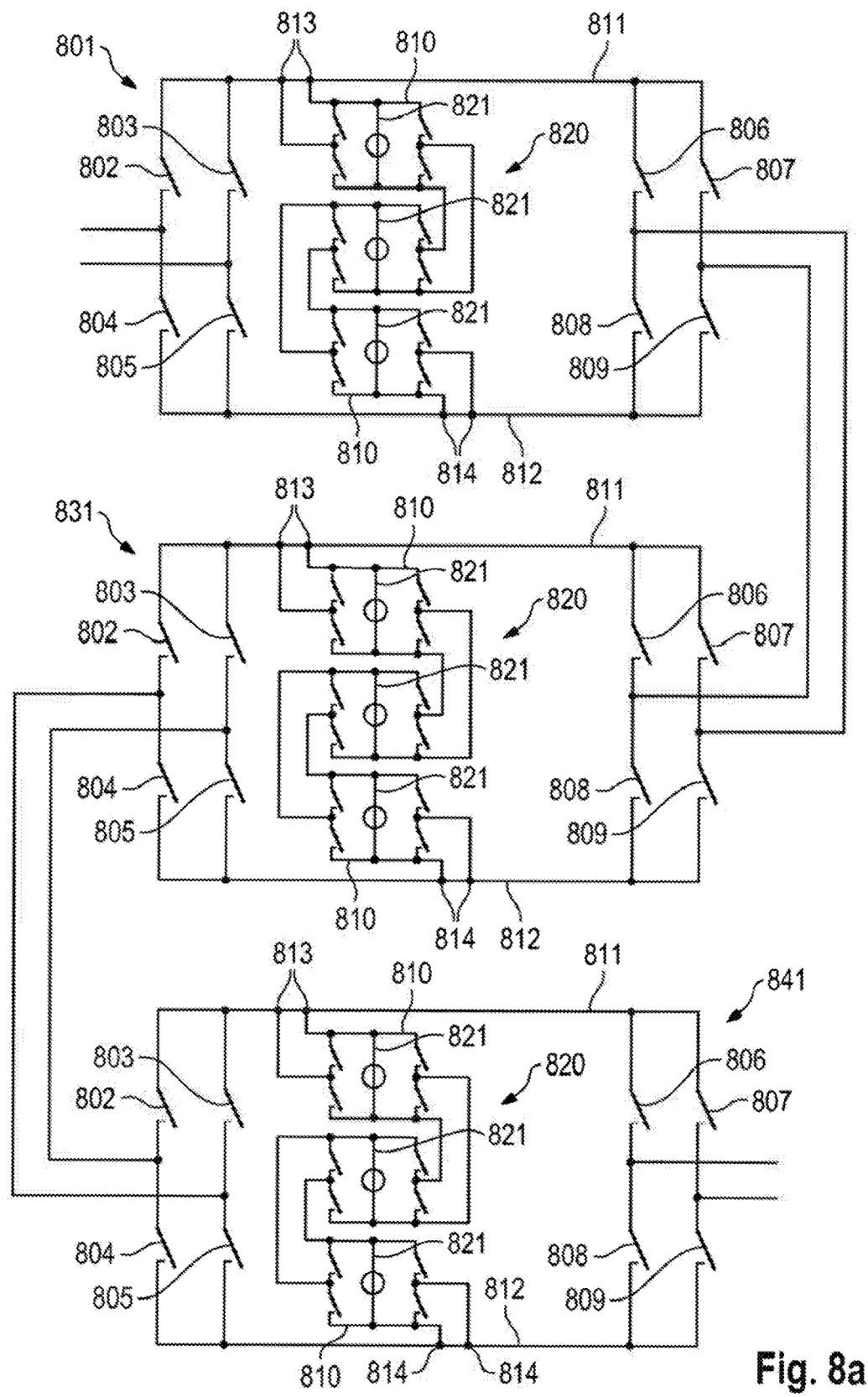
FIGS. 8a and 8b show further embodiments of the converter system according to aspects of the invention comprising embedding and embedded modules.

FIG. 8*a* shows a further embodiment of a converter system according to aspects of the invention in which three embedding modules 801, 831, 841 are interconnected with one another, wherein each embedding module 801, 831, 841 in each case comprises a module string 820 connected by at least one terminal, here by the terminals 813, 814, in each case to the positive and/or negative busbar 811, 812 of the modules 801, 831, 841. In the embodiment shown, the module string 820 comprises in each case three embedded modules 810 of the same type. In terms of their topology, the embedding modules 801, 831, 841 are an M2SPC-4q module comprising eight switching elements 802 to 809. The embedded modules 810 differ from the embedding modules 801 and have an M2SPC-2q module topology comprising in each case four switching elements and an energy string 821.

Figure 8B:
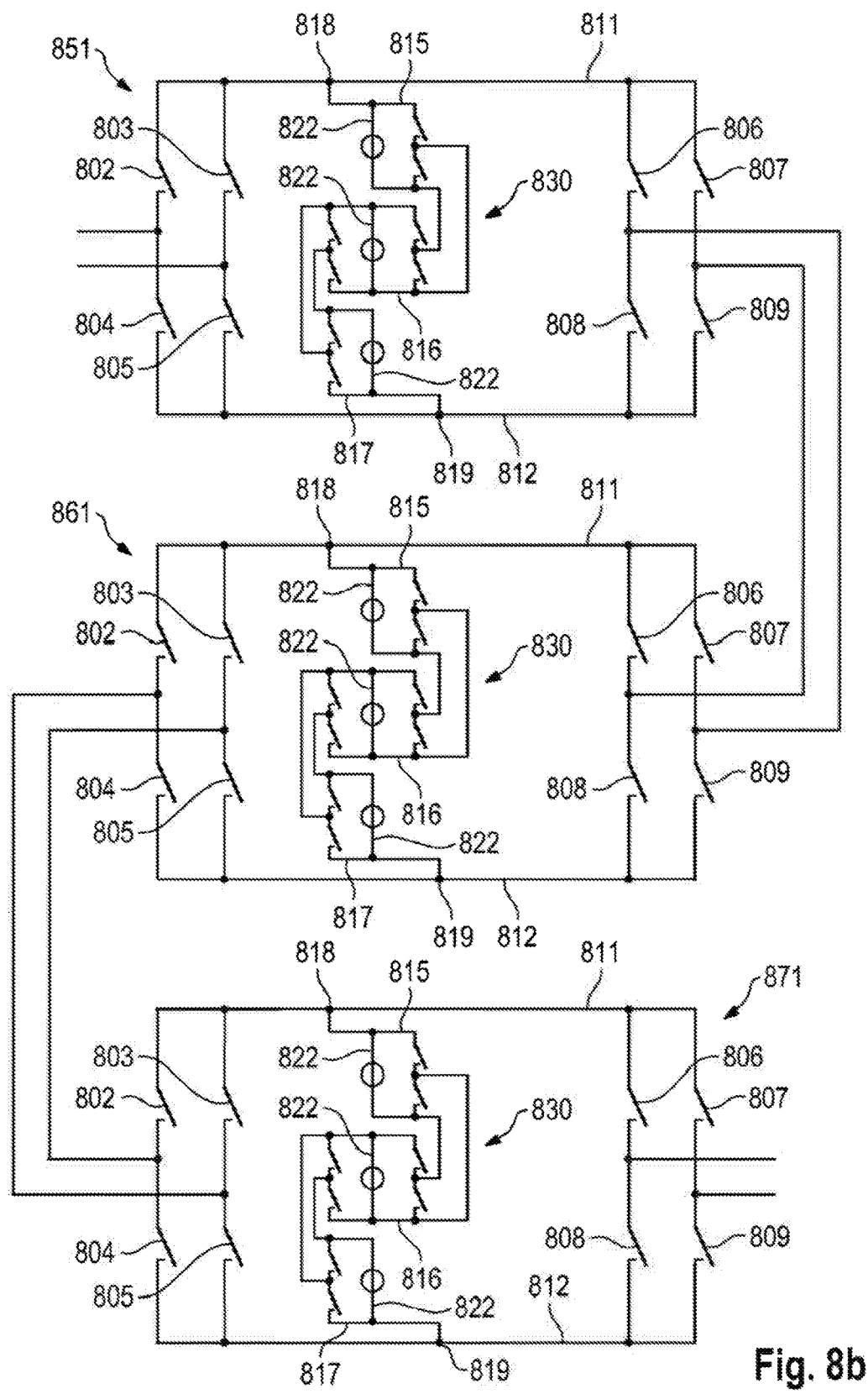

FIG. 8*b* shows a further embodiment of a converter system according to aspects of the invention in which the module string 830 comprises three embedded modules 815, 816, 817 that differ from one another. The embedding modules 851, 861, 871 are in each case an M2SPC-4q module as described in FIG. 8*a*. The respective module strings 830 of the embedding modules 851, 861, 871 are identical in each case. At least one embedded module 815, 817 is embodied such that it is electrically connected by exactly one electrical terminal 818, 819 to a positive busbar 811 and/or a negative busbar 812 of an embedding module 851, 861, 871. The embedded modules 815, 816, 817 each comprise at least one energy string 822.

Figure 9A:
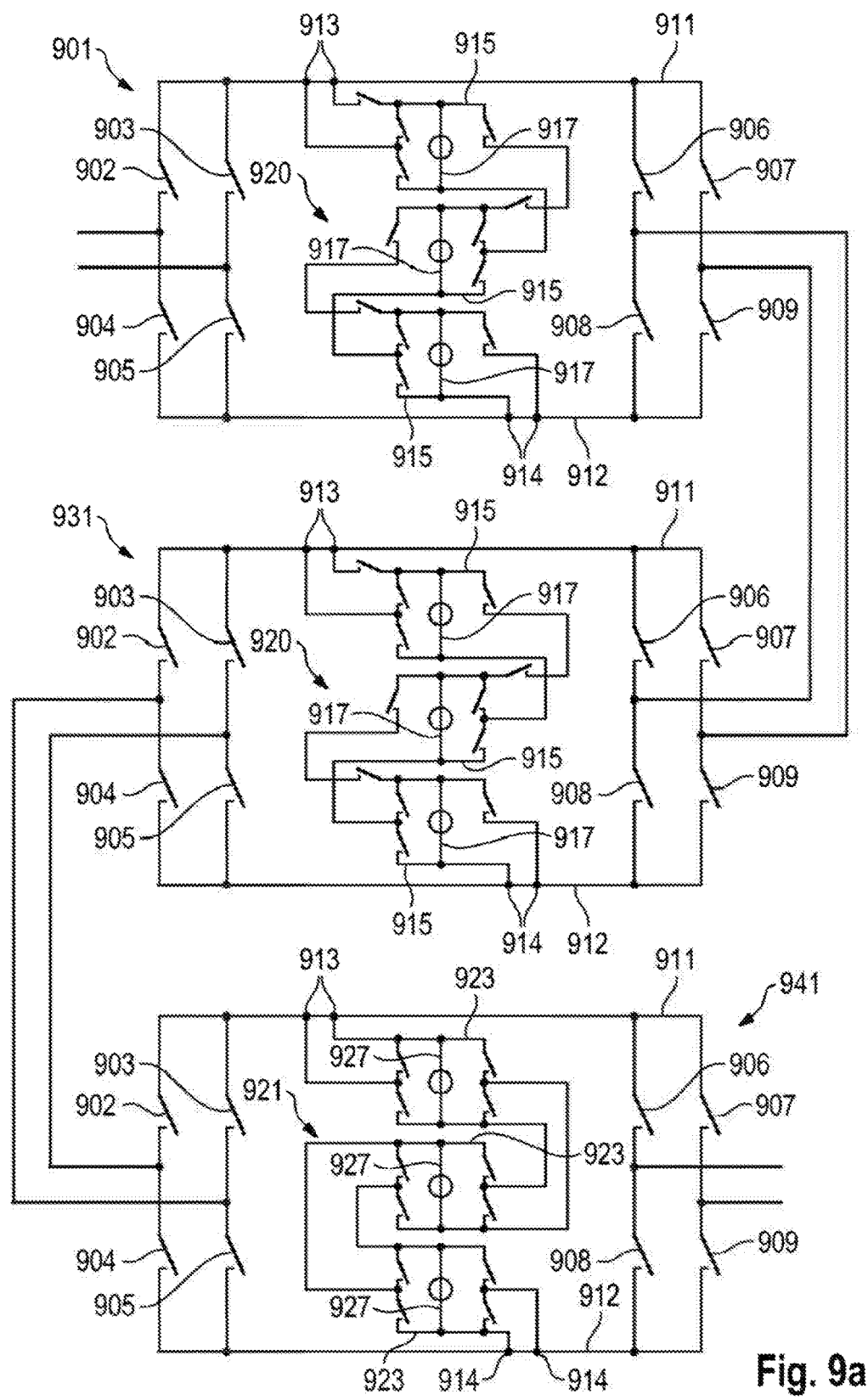
FIGS. 9a and 9b show even further embodiments of the converter system according to aspects of the invention comprising embedding and embedded modules.

FIG. 9*a* shows a further embodiment of a converter system according to aspects of the invention in which the respective module strings 920 of the embedding modules 901 and 931 are identical, but the module string 921 of the module 941 differs therefrom. The module string 920 in the modules 901 and 931 comprises three modules 915 of the same type, which are each connected to one another in the same way and each have an energy string 917. The module string 921 of the module 941 comprises three modules 923 of the same type, each having an energy string 927. Likewise, the modules 915, 923 also differ from one another. The embedding modules 901, 931, 941 are M2SPC-4q modules, and the embedded modules 915, 923 are M2SPC-2q modules.

Figure 9B:
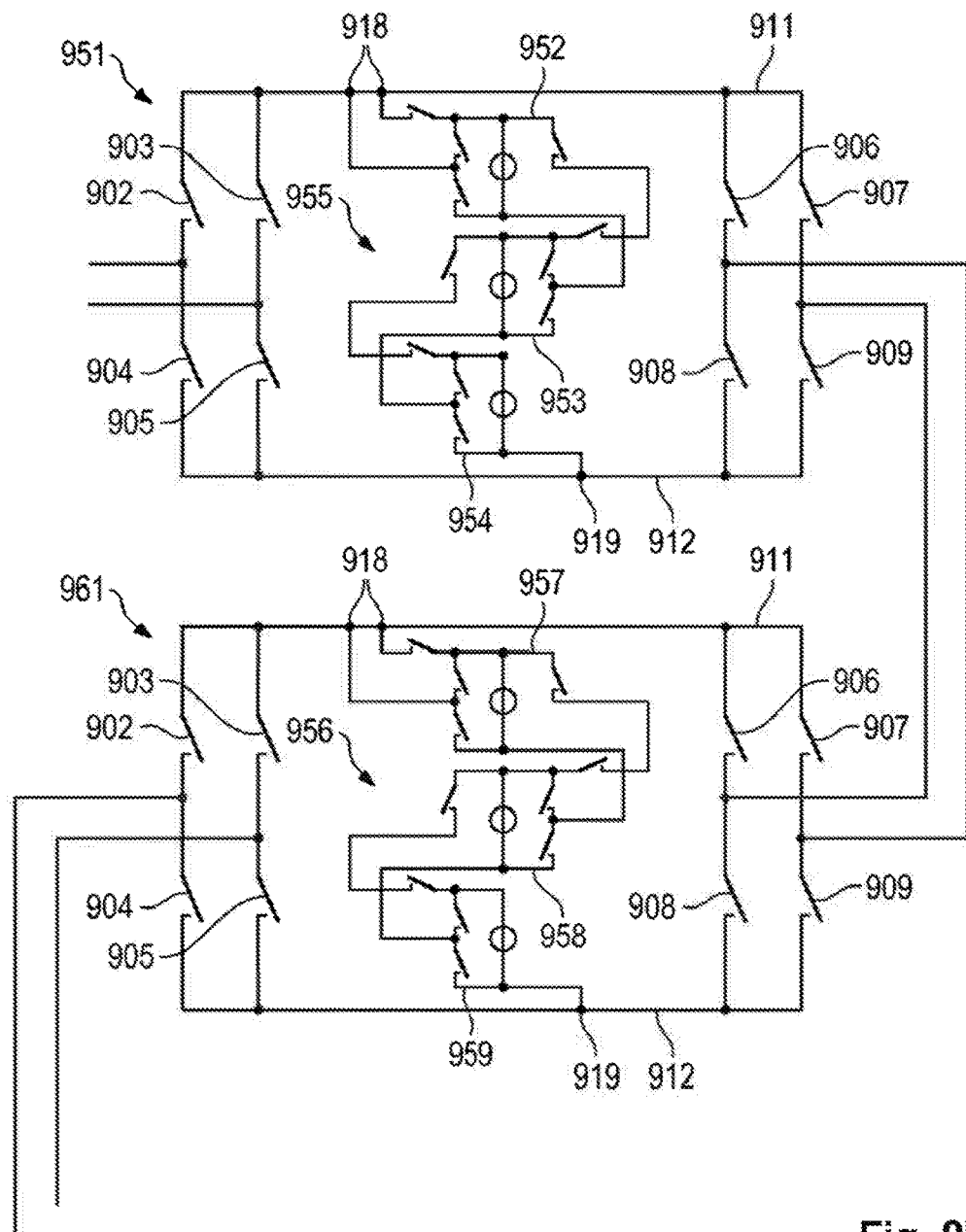

FIG. 9*b* shows a further embodiment of a converter system according to aspects of the invention comprising two embedding modules 951, 961 interconnected with one another. The embedding modules 951, 961 have an M2SPC-4q topology and a respective module string 955 and 956 comprising respective modules 952, 953, 954 and 957, 958, 959. The modules 952, 953, 957, 958 and 954, 959 differ from one another, but substantially have an M2SPC-2q topology. The embedded modules 952, 957 are each connected by two terminals 918 to one busbar 911. The embedded modules 954, 959 are connected by only one terminal 919 to another busbar 912. The embedded modules 952, 953, 954, 957, 958, 959 each comprise an energy string.

The embodiments shown in FIGS. 8*a*, 8*b*, 9*a*, 9*b* use two-quadrant modules, for example M2C-2q or M2SPC-2q, as embedded modules and four-quadrant modules, for example M2C-4q or M2SPC-4q, as embedding modules. The overall converter thus has a four-quadrant capability, but saves almost half of the required semiconductors compared with a use exclusively of four-quadrant modules. This saving without any loss of important functions is possible since embedding four-quadrant modules into four-quadrant modules additionally allows only an inversion of the polarity at a plurality of levels, but multiple inversion similar to an integral power of (−1) is redundant and the result can be achieved with a single polarity inversion possibility. Preferably, said polarity inversion possibility is provided for saving semiconductors at the highest level of embedding and is implemented there with four-quadrant module since these modules are present in a smaller number. Without restriction in principle, the possibility for polarity changes can also be implemented in modules in a deeper nesting level and also in elementary modules.

Besides an irregular embedding with a small nesting depth, for example with only one or two nesting levels, there is the possibility of realizing the matryoshka converter according to aspects of the invention with a regular embedding structure. A regular structure having the replicability q embeds for example a collection of q modules into a superordinate embedding module. The q embedded modules can themselves be either embedding modules each having q embedded modules or elementary modules which themselves contain an energy storage element and no further embedded modules. As a special case, elementary modules and embedding modules can also be mixed. The order r of this regular matryoshka converter, that is to say the maximum number of levels from the outermost level to an innermost level with an elementary module, can be chosen in accordance with the physical and technical requirements in respect of output power, power loss, fail-safety and the like. For q=2 a structure arises in which each elementary module can be switched in a manner electrically connected to each other elementary module in the switching states provided by either the embedding or the embedded module topologies (for example the parallel state in the case of M2SPC). For q=2 a converter thus offers virtually the highest possible flexibility and each pair of two elementary modules of the converter can be directly interconnected with one another regardless of how far away from one another they are in the converter circuit and how many other modules are situated between them. While the M2SPC, for example, can only connect individual modules in parallel among one another, the regular matryoshka converter can also connect any arbitrary length of inherently serially connected chains of modules, for example two or more modules, in parallel with one another.

For higher q the interconnection possibilities are slightly restricted and it is no longer possible for each elementary module to be directly interconnected with each other elementary module.

The modules and module strings presented in FIGS. 4 to 9b serve for implementing a method according to aspects of the invention and can be used by themselves or in combination for this purpose.

The invention claimed is:

1. An electrical converter system comprising:
   an outside loop including a plurality of embedding modules of a first nesting level interconnected with each other, each respective embedding module including:
   a positive terminal,
   a negative terminal,
   an output terminal,
   an outside half-bridge of outside switching elements connected between the positive and negative terminal, and
   an embedded module string connected to the positive terminal and the negative terminal of the respective embedding module and including a plurality of embedded modules of a second nesting level in an inside loop that is surrounded by the respective embedding module;
   wherein:
   each of the embedded modules include a plurality of inside switching elements and an energy string,
   the inside switching elements switch between the embedded modules of the inside loop, and
   the outside switching elements switch between the embedding modules of the outside loop.

2. The electrical converter system as claimed in claim 1, wherein the embedded modules of the second nesting level in the inside loop are electrically connected by exactly one electrical terminal to at least one of a positive busbar or a negative busbar of the respective embedding module of the outside loop.

3. The electrical converter system as claimed in claim 1, wherein the energy string of each of the embedded modules comprises at least one energy store.

4. The electrical converter of claim 1, wherein the outside switching elements of the outside half-bridge are connected in series between the positive terminal and the negative terminal and wherein the output terminal is coupled between the outside switching elements.

5. The electrical converter as claimed in claim 1, wherein: the outside switching elements each comprise a gate-turn-off thyristor (GTO), mechanical relay, transistor, or a diode.

* * * * *